July 20, 1943.    M. L. HART    2,324,698
WELL MEASURING DEVICE
Filed Sept. 21, 1940    2 Sheets-Sheet 1
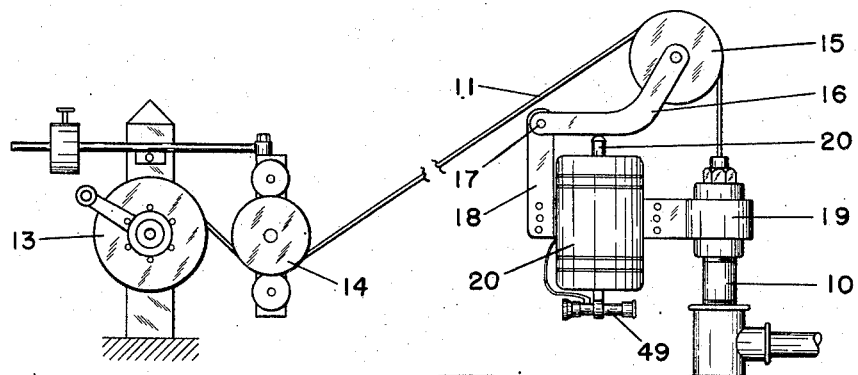
Fig. 1.
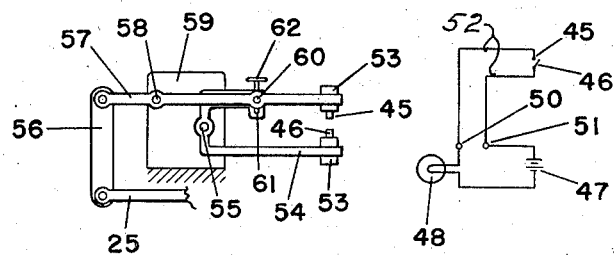
Fig. 4.
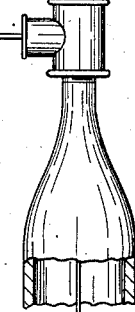
Fig. 3.
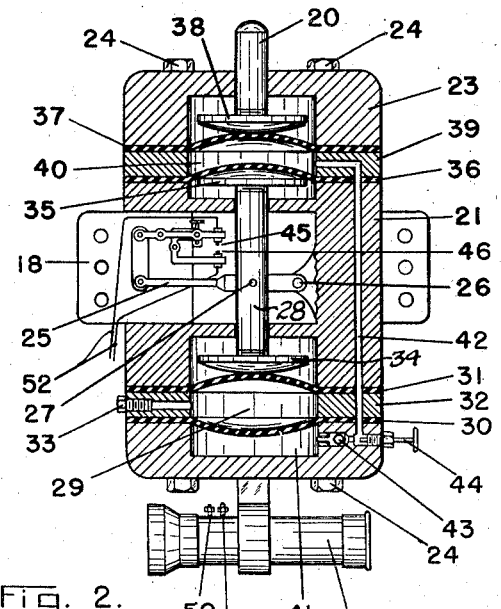
Fig. 2.
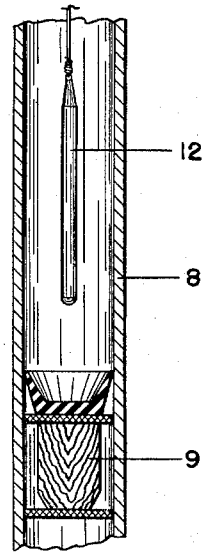
INVENTOR
MERIDA L. HART
BY Earl Babcock July 20, 1943.   M. L. HART   2,324,698
WELL MEASURING DEVICE
Filed Sept. 21, 1940   2 Sheets-Sheet 2

INVENTOR
MERIDA L. HART
BY
Earl Babcock

Patented July 20, 1943

2,324,698

UNITED STATES PATENT OFFICE 2,324,698

WELL MEASURING DEVICE

Merida L. Hart, Chickasha, Okla., assignor to Halliburton Oil Well Cementing Company, Duncan, Okla.

Application September 21, 1940, Serial No. 357,715

1 Claim. (Cl. 33—126.6)

This invention relates to well measuring devices, and more particularly to apparatus adapted for use with a measuring line for determining the position of a device in a well, such, for example, as a plug used in the cementing of an oil well or the like.

In the United States patent to Halliburton, No. 1,692,037, granted November 20, 1928, for "Well sounding device," an arrangement involving the use of a measuring line is shown and described for determining the position of a plug in a well during a cementing operation. The invention relates to an improvement on the apparatus there disclosed.

If a weight is secured to a measuring line and lowered into a well, above a cementing plug, as described in the Halliburton patent mentioned above, it is not always easy to tell whether or not the weight is resting on the plug and the measurements of depth are, of course, of no value unless the position of the weight with respect to the plug is known. This difficulty arises particularly if the well is very deep or if it is crooked. The friction of drag of line on the wall of the well makes it difficult for the cementer, or other person carrying on the operations, to feel variations in tension caused by the weight on the measuring line striking or leaving the cementing plug.

In accordance with the present invention measurements of depth are accurately correlated with the position of the object being measured by the provision of an apparatus which will automatically indicate slight variations in tension in a measuring line in a well such as are caused by a weight on the line striking or leaving the object. Accordingly, it is one object of the invention to provide sensitive signalling means responsive to the position of a weight on a measuring line with respect to a cementing plug or other object in a well, whether the object is moving or stationary.

It is a further object of the invention to provide signalling apparatus which will be responsive to relative movement between two members traveling downwardly in a well without being responsive to the total weight of a measuring line or other flexible device connected to one of the elements.

Other objects reside in certain novel features of the arrangement and construction of parts, as will be apparent from the following description taken in connection from the accompanying drawings in which:

Figure 1 is a somewhat diagrammatic view of the upper portion of an oil well with a measuring line and operating equipment associated therewith, in which one embodiment of the present invention has been incorporated;

Figure 2 is a side view, partially in cross-section, of a portion of the indicating apparatus used in the arrangement of Figure 1;

Figure 3 is a diagram of a simple electrical circuit used in the arrangement of Figure 1;

Figure 4 is an enlarged view of the electrical contact or switching means used in the arrangement of Figure 2;

Figure 7:
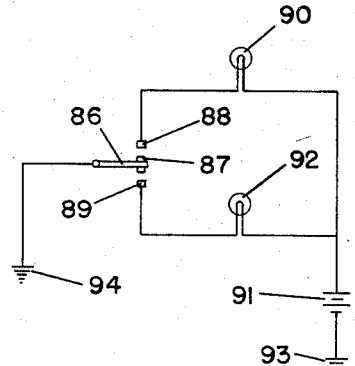
Figure 7 is an electrical circuit diagram used in the arrangement of Figure 5.

Referring to the drawings in detail, and first to the embodiment shown in Figures 1, 2, 3, and 4, it will be seen a casing of an oil well is illustrated at 8, Figure 1, there being an object such as a cementing plug 9 therein, the position of which is to be measured. As shown at 10, the casing is provided with a stuffing box and staff assembly, this structure being the same as that commonly used in connection with cementing operations and illustrated in the Halliburton patent cited above.

The measuring line 11 has a weight 12 on its lower end. The line passes from the reel 13 through a measuring head 14 and then over a pulley 15, located at the well head and into the well. The mounting for the pulley 15 differs from that shown in the Halliburton patent cited above, in that it is mounted on a lever 16, the lower end of which is pivoted, as at 17, upon a frame member 18, clamped as shown at 19, upon the upper end of the stuffing box and staff assembly 11. The lever 16 actuates a plunger 20, the purpose of which will presently appear.

The measuring head 14 is provided with a depth indicating register as disclosed in Patent 1,692,037 mentioned above.

Also mounted on the frame 18 is an indicating assembly, which constitutes one form of the present invention and which is shown in detail in Figure 2. This assembly includes suitable housing members 21, 22 and 23, which are fastened together by means of bolts 24. The central housing member 21, has a switch operating arm 25, pivoted internally thereof, as shown at 26, and this arm is, in turn, loosely connected by a pin 27, to a vertically extending rod 28.

As shown in Figure 1, the indicating assembly is so mounted with respect to the lever 16, that the plunger 20 abuts against the lever 16 at a point near its fulcrum 17. To hold the plunger 20 in this position, and to exert some upward thrust upon the lever 16, and thus counter-balance the forces in the measuring line tending to move the pulley 15 downwardly, some resilient means is provided. In the form of the invention shown in Figure 2, this consists of a compressed air chamber 29, provided by clamping two flexible diaphragms 30 and 31, and a ring 32, disposed between the main housing member 21 and the lower housing member 22. The desired pressure can be maintained in the chamber 29, through a valve 33 such as that used on an automobile tire.

As shown in Figure 2, the upper diaphragm 31 abuts against an arcuate contact shoe 34, which is integral with the rod 28. At its upper end the rod 28 is provided with an additional shoe 35 contacting a diaphragm 36. These are designed to cooperate with an additional flexible diaphragm 37 and an upper shoe 38 on the plunger 20. The diaphragms 36 and 37 are clamped between the main housing member 21, the upper housing member 23 and a spacing ring 39.

By this construction a chamber 40 is provided between the diaphragms 36 and 37 and a chamber 41 is provided by the lower diaphragm 30 and the lower housing member 22. A suitable passageway 42 is formed in the housing members and spacing rings, to connect the chamber 40 to the chamber 41. At a point near the chamber 41 in the passageway 42, a check valve is mounted, as illustrated at 43. This valve is adapted to seat when fluid tends to flow from the chamber 41 to the chamber 40, so as to prevent such flow, while permitting free flow of fluid from the chamber 40 to the chamber 41. A plunger 44 may be used to manually release the check valve and permit fluid to flow in either direction when desired.

In the arrangement just described, it will be seen that the air pressure in the chamber 29 always tends to lift the plunger 20. It will also be seen that if the chambers 40 and 41 are filled with some fairly incompressible fluid such as oil, downward pressure exerted upon the plunger 20 will tend to further compress the air in the chamber 29. Also it will be seen that unless the valve 43 is released, the fluid pressure in the chamber 41 will always be equal to, or greater than the fluid pressure in the chamber 40. It will be equal to the pressure in the chamber 40 when the check valve 43 is open, and it will be greater than the pressure in the chamber 40, if the plunger 20 ever moves upwardly ever so slightly, after it has been pushed down, for then the check valve 43 closes and the pressure in the chamber 41 is maintained, while the pressure in the chamber 40 is released slightly.

To indicate any slight upward movement of the plunger 20 after it has moved downwardly, the operating arm 25 is provided with suitable link mechanism operating an electrical contact member 45, mounted adjacent electrical contact 46.

The contacts 45 and 46 constitute an electrical switch which may be connected in a circuit such as shown in Figure 3, which circuit includes a battery 47 and an electric light 48 which serves as an indicator. A convenient way of accomplishing the purpose is to mount an ordinary flashlight 49 on the indicating assembly, after modifying the flashlight structure to the extent that electrical contacts 50 and 51 are provided instead of the usual switch on the flashlight body, these contacts 50 and 51 being connected to the switch contacts 45 and 46, by means of electrical conductors in a conduit, like that shown at 52. The contacts 45 and 46 are each mounted on insulating washers 53. Contact 46 is supported on a bell crank arm 54 pivoted at 55. The bearing 55 has sufficient friction to prevent movement of the bell crank except when moved by the contact 45. Thus the contact 46 can be moved downwardly by the contact 45 but not upwardly.

The contact 45 moves downwardly whenever the rod 28 moves upwardly. To accomplish this, a link 56 connects the outer end of arm 25 to a lever 57 pivoted at 58 on a portion 59 of the housing 21. The lever 57 supports the contact 45 and is also provided with a pin 60 projecting into a slot 61 in an extension of the bell crank 54. This serves to limit the amount contacts 45 and 46 can separate. An adjusting screw 62 may be provided to regulate the amount of this separation. It will also be seen that the slot 61, pin 60 and screw 62 serve to move the contact 46 upwardly when the rod 28 moves downwardly. In other words, the contacts are held in adjustable spaced relation regardless of the position of the rod 28 and that they will touch each other and close the electrical circuit whenever the rod 28 moves upwardly a slight distance from any given position.

While the apparatus of the present invention is primarily designed for use in connection with cementing operations of oil wells, its operation will first be explained in connection with the measuring of a fixed object in a well, since the operation for that purpose is easier to explain.

Let it be assumed that a plug 9 is at a fixed point in an oil well. The measuring line 11, with the weight 12 thereon, is lowered into the well at whatever speed is desired without paying any attention to the signaling means until the weight is down to a point which the operator believes is somewhere near the plug 9. The brake on the reel 13 is then applied until the weight 12 is moving very slowly.

As the weight 12 moves down, the tension in the line 11 gradually increases due to the increased amount of line in the well, and this causes the plunger 20 to be slowly depressed. This, in turn, causes the rod 28 gradually to move downwardly slightly. It will be seen that, as this takes place the contacts 45 and 46 remain separated and nothing is indicated. During the movement just described, the brake on the reel should exert substantially constant resistance to movement of the reel, for otherwise, variations in tension due to variations in braking power cause false flashing of the signal.

With the conditions as just described, when the weight 12 strikes the plug 9, the tension in the measuring line 11 is slightly decreased and the signal lamp 48 flashes, at which time a reading on the measuring head 14 can be made and the position of the plug accurately determined.

To check the indication, the operator may now reel in the line very slowly, so as not to cause any appreciable variations in tension in the line 11 due to inertia and the signal lamp 48 goes out when the weight 12 leaves the plug 9.

The flow of fluid and movement of parts in the arrangement of Figure 2 during the operations just described is as follows:

As the plunger 20 is depressed oil or other fluid flows from the chamber 40 through the passageway 42 into the chamber 41. At the same time the rod 28 moves downwardly, the air in chamber 29 is compressed, and the contacts 45 and 46 both move upwardly slightly, the distance between them remaining constant.

If the load on the plunger 20 is then released somewhat, it moves upwardly, the check valve 43 closes, the pressure in chambers 41 and 29 is greater than that in chamber 40 and the rod 28 is accordingly raised slightly. Contact 46 remains stationary, due to friction in bearing 55, but contact 45 is depressed, making contact and lighting lamp 48.

If the load on plunger 20 is then again applied, it will move downwardly and when the pressure in chamber 40 again becomes equal or greater than that in chamber 41, the rod 28 will move downwardly and the circuit at 45—46 will be broken.

The arrangement is designed to be as sensitive as possible to variations in tension in the line without being sensitive to those factors which would cause spurious signals. Thus, for example, if weight 12 will increase the tension in the line 10 pounds, in mud or cement of a given density in the well, the signaling apparatus should be designed to cause the switching contacts 45 and 46 to make or break contact in response to variations and tension of, say, 9 pounds, but not 8 pounds.

The operation of the device when the plug 9 is moving is the same as described above, except that both the weight 12 and the plug 9 are moving downwardly at nearly a constant velocity and greater care must be exercised in avoiding false signals due to changes in velocity or in interpreting the signals. In this connection it is to be noted that the lamp 48 lights in response only to a decrease in tension in the measuring line. The total weight of line in the hole has no effect on the signal; only a change in tension actuating the switch 45—46.

Now, when both the weight 12 and plug 9 are moving down simultaneously, if the weight 12 leaves the cementing plug, as takes place in the event the measuring line is not fed into the well as fast as the cementing plug is being pumped down, additional weight is placed upon the measuring line and additional tension therein with the result that contact 45 moves upwardly and away from contact 46. There will be nothing indicated, and the operator will have to release the weight on the measuring line reel slightly in order to permit the weight 12 to move faster and catch up with the cementing plug. Upon the measuring line weight 12 again catching up with the plug there is a slight decrease in the tension in the measuring line, and at that time contact 45 moves downwardly into contact with contact 46 to close the electrical circuit and cause the lamp 48 to burn. The operator will then know the position of the weight 12 with respect to the cementing plug.

Of course, the signal will sometimes flash in response to other conditions than the contact of the weight 12 with the cementing plug or other object being moved in the well. The operator will have to exercise some judgment in using the device, and interpret the signals accordingly. For example, the tension in the line will vary as the result of either increase or decrease of velocity of movement of weight 12. If the operator suddenly releases the brake on reel 13, and the signal flashes, the operator should not interpret that signal as an indication that the weight 12 has hit the cementing plug, for such is not the case. The signal is responsive to variations in tension in the line whatever their cause and must be so regarded in order to use the device successfully.

In the embodiment of the invention just described only one signal lamp is employed and the circuit for it is designed to close upon a decrease in tension in the measuring line. In many cases it is desirable to employ two signal lamps and so arrange the system that one of these lamps will be illuminated when tension in the line is decreased and the other illuminated when tension in the line is increased. Apparatus of this type is shown in Figures 5, 6 and 7 of the drawings.

Figure 5:
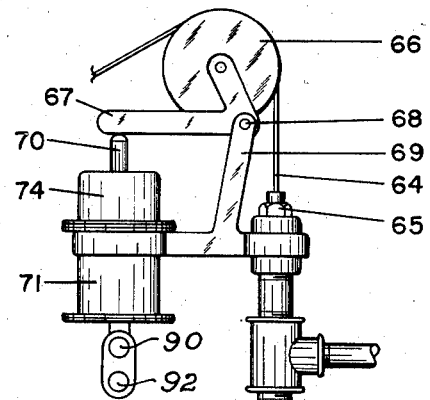
Figure 5 is a side view of a modified form of the invention.
Figure 6:
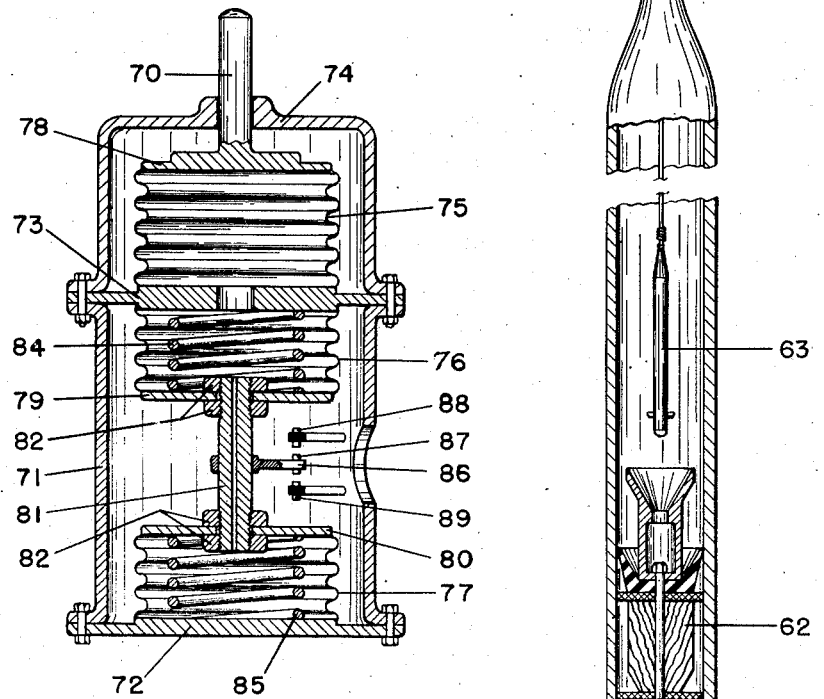
Figure 6 is an enlarged cross-sectional view of a portion of the apparatus of Figure 5.

Referring first to Figure 5, attention is called to the fact that special latching arrangement is shown for connecting the plug 62 to the weight 63 on the measuring line. The latching arrangement may be the same as that disclosed in United States patent to Scaramucci, No. 2,155,620, granted April 25, 1939, for "Measuring line equipment" and will not be described here in detail.

It is within the purview of the invention to provide suitable latching means between the plug and the weight or to dispense with any latching means and employ merely the circuit of Figure 1. It may be desirable in some cases to use a latch, however, either in the arrangement of Figure 1 or in the arrangement of Figure 5, the advantage being, obviously, that the weight on the measuring line need not be so heavy where a latch is used, inasmuch as the latch will cause variations in tension in the measuring line, which will affect the signals.

Referring again to the arrangement of Figure 5, the measuring line 64 which is connected to the weight 63 through the usual stuffing box and staff assembly 65 and then over the pulley 66. The pulley 66 is mounted on a bell crank lever 67 pivoted at 68 upon a supporting bracket 69 swiveled to the stuffing box and staff assembly. The apparatus for converting variations in tension in the line into signals may also be mounted upon the bracket 69. As shown, this includes a plunger 70 mounted for vertical movement beneath the outer end of the bell crank lever 67. Associated with the plunger 70 is a system of bellows and springs shown in detail in Figure 6. As there shown, a cylindrical flanged housing member 71 has an end plate 72 bolted at its lower end, an intermediate plate 73 bolted at its upper end, and a protecting and guiding inverted cup 74, through which the plunger 70 passes.

The housing 71 and the cup 74 contains three Sylphon bellows. One of these, shown at 75, is disposed within cup 74, the lower end being clamped between the cup 74 and the intermediate plate 73. Another shown at 76 is mounted just beneath the plate 73, its upper end being clamped between the plate 73 and the housing 71. A third bellows member 77 is mounted in the lower portion of the housing 71, its lower end being clamped between the housing 71 and at end plate 72.

The upper end of bellows 75 is provided with a rigid disc 78 against which the plunger 70 abuts. Bellows 76 and 77 are also provided with rigid discs 79 and 80, respectively, and these are connected together by a pipe 81 and nuts 82, threaded thereon. The pipe 81 has a small bore 83 therein, this bore serving as a choke in transmitting air or other gas from the interior of bellows 76 to bellows 77, or by vice versa. Mounted within bellows 76 is a coil compression spring 84, this spring abutting against the plate 73 and tending to urge the disc 79 downwardly. Within the bellows 73 another compression spring 85 is provided, this spring being identical in construction with the spring 84. The spring 85 abuts against the end plate 72 and tends to urge the disc 80 upwardly. It will be seen that the construction is such that the springs 84 and 85 balance each other, tending always to return the discs 79 and 80 and the pipe 81 to the position shown, in the event that they are moved either up or down slightly.

To indicate movement of the discs 79 and 80, the pipe 81 has a switch arm 86 mounted rigidly thereon. The arm 86 may itself have some resiliency and has a contact button 87 at its outer end, this being adapted to engage either the contact 88 or the contact 89, these latter being fixed to the housing member 71.

The electric circuit for the arrangement of Figures 5 and 6 is shown in Figure 7. As there shown the contact button 88 is connected to a signal lamp 90, which is in turn connected to a battery 91 while the contact battery 89 is connected to a lamp 92, also connected to the battery 91, the other side of the battery being grounded as shown at 93 and the contact 87 on the arm 86 being also grounded as shown at 94. Thus an electric circuit is provided in which the lamp 90 will be illuminated whenever the pipe 81 moves upwardly from the position shown in Figure 6 and the lamp 92 will be illuminated whenever the pipe 81 moves downwardly from the position shown in Figure 6. The operation of the arrangement shown in Figures 5, 6 and 7 is as follows:

Let it be assumed that the plug 62 and weight 63 are moving downwardly in a well being held together by a suitable latch which will permit them to separate on a pull, say of 30 lbs. The operator is manipulating the brake on the reel upon which the measuring line is wound in such a way as to keep the line fairly taut. Assume now that it is the desire of the operator to determine definitely whether the weight 63 is in engagement with the plug 62. As the braking power is increased, movement of the measuring line is decreased and as the plug 62 is forced downwardly by hydraulic pressure, a sudden increase in tension in the measuring line is brought about and then as the latch releases a sudden decrease in tension in the measuring line is effected. This sequence of variations in tension in the line cannot be brought about by ordinary movement of the weight 63 and the line 64 in the well, such as might be caused by the weight striking a collar, and furthermore the variations in tension will be greater than any that might be caused by frictional engagement of the line or the weight with the wall of the hole.

The apparatus of Figure 6 indicates the variations in tension described above. As the tension in the line is increased the plunger 70 is forced down, thus increasing the gas pressure within the bellows 75 and 76. The bore 83 in the pipe 81 being small, a differential in fluid pressure will thus be set up within bellows 76 and 77 and the pipe 81 will move downwardly causing engagement of contacts 87 and 89 and the illumination of signal lamp 92. The difference in pressure within the bellows will be only temporary for as soon as sufficient gas flows through the bore 83, the pressure will be equalized although having a somewhat greater total pressure than before as long as the plunger 70 is depressed.

Now when the latch between the weight and the plug releases these elements, the plunger 70 moves upwardly slightly from its previous position and the pressure within the bellows 77 is greater than that in the bellows 76. The pipe 81 then moves upwardly to cause contacts 87 and 88 to engage and the lamp 90 to be illuminated.

It is to be noted that the above movement takes place regardless of the initial position of the plunger or in other words, regardless of the total weight of measuring line in the hole. As additional amounts of measuring line are fed into the hole the plunger 70 moves downwardly but this movement is so gradual that it does not cause a difference in pressure within the bellows 76 and 77 inasmuch as gas can flow from one to the other through the bore 83 rapidly enough to take care of slow changes in pressure.

It is, of course, within the purview of the invention to use various expedients known to those skilled in the art, instead of the particular arrangement illustrated. Electric bells may be used instead of signal lamps. Counting apparatus may be employed to indicate the number of times the switch 45 and 46 of the arrangement of Figure 2 is opened or closed during a cementing operation and like apparatus may be used in connection with the arrangement of Figure 6. A wide variety of springs, bellows, levers, diaphragms and pressure chambers may be employed and it is to be understood that the two embodiments of the invention shown in the drawing are to be regarded as illustrative only. It is to be understood therefore that various expedients may be resorted to without departing from the spirit of the invention or the scope of the fixed claim.

I claim:

In apparatus adapted for measuring the depth of an object in an oil well or the like, the combination with a measuring line having a weight member thereon adapted to be lowered into the well, of a signalling system associated with said line for indicating the position of said weight member with respect to said object, said signalling system including an electrically operated signal, an electric switch in the circuit of said signal, and mechanism for operating said switch in response to sudden variations in tension in said measuring line caused by relative movement of the weight member with respect to said object, said mechanism having diaphragm chambers therein and a restricted conduit for conducting fluid from one chamber to another, whereby gradual changes in tension in said line will not operate said switch and signal.

MERIDA L. HART.